Feb. 17, 1970  R. D. JONES  3,496,376
AUXILIARY ELECTRICAL DISTRIBUTION SYSTEMS AND APPARATUS
Filed Oct. 9, 1967  6 Sheets-Sheet 1

INVENTOR.
RICHARD D. JONES
BY Ernest H. Schmidt
ATTORNEY.

Feb. 17, 1970  R. D. JONES  3,496,376
AUXILIARY ELECTRICAL DISTRIBUTION SYSTEMS AND APPARATUS
Filed Oct. 9, 1967  6 Sheets-Sheet 5

INVENTOR.
RICHARD D. JONES
BY Ernest H Schmidt

ATTORNEY.

United States Patent Office 3,496,376
Patented Feb. 17, 1970

3,496,376
AUXILIARY ELECTRICAL DISTRIBUTION SYSTEMS AND APPARATUS
Richard D. Jones, 5616 NW. 2nd Ave., Miami, Fla. 33127
Filed Oct. 9, 1967, Ser. No. 673,886
Int. Cl. H02j 9/02
U.S. Cl. 307—23                                                9 Claims

ABSTRACT OF THE DISCLOSURE

Auxiliary distribution by-pass apparatus for use in association with a main electrical power distribution panel, including an auxiliary panel located in spaced relation with respect to the main panel and having distributor circuit plug-in connectors and transfer switches and associated wiring for transferring distributor circuits extending from the main panel to the distributor circuit plug-in connectors, and a portable distribution panel having a main power input and distribution circuits terminating in plug-in type connector members, and further including a plurality of patch cable assemblies adapted for selective interconnection between the plug-in connector members of the portable distribution panel and the auxiliary panel plug-in connectors.

---

This invention relates to electrical power distribution, and is directed particularly to novel and improved auxiliary electrical systems and apparatus for transferring from a main to an auxiliary electrical distribution panel under emergency conditions or for routine maintenance of the main panel.

At the present time electrical supply to large buildings is fed to a distribution panel permanently located in the buildings and fed through main feeders from the utility company source of supply. The distribution panel contains, principally, switches and circuit-breakers in circuits fed from common electrical bus bars for distribution to the various lighting and power circuits in the building. In the case of buildings requiring great quantities of electrical power, such as in heavy industry, telephone central offices, military installations, large hospitals and the like, not only are the electrical distribution panels necessarily very large and expensive to carry the heavy currents involved, often in the range two to four thousand amperes, but they must operate continuously in most instances, and therefore be of utmost reliability since power failure occurring unexpectedly in such electrical installations can be extremely disrupting, if not disasterous, particularly in the case of military installations and in large telephone central offices. Moreover, as a method of preventive maintenance in some industry manufacturing plants, the electrical distribution panels are routinely shut down every few months or so and expensive circuit-breakers, switches and the like are replaced in an attempt to keep the possibility of equipment break-down and consequent power failure to a minimum.

In the case of military installations and telephone central office equipment buildings and the like, where shut-down of operation cannot be tolerated for even a short time, it has become common practice to periodically set up a temporary substitute panel near the building distribution panel and labouriously splice in main supply feeders and the various building distribution circuits, after which they are disconnected or cut from the building panel so that the main panel can be worked on. When the maintenance of the main panel has been completed, the main feeders and distribution circuits are transferred again from the temporary distribution panel to the reconditioned main panel. Since this splicing and transfer process necessitates the handling of many thousands of feet of heavy and expensive electrical cable, and involves many hours of painstaking work, it is very expensive to accomplish not only in labor cost but also in the cost of the cables and other materials used in splicing.

In an attempt to reduce the cost of distribution panel maintenance as described above, I have developed a high current capacity portable distribution panel that can be wheeled into the building to be serviced, and which is small enough to be carried in elevators and moved through narrow hallways for placement near the building distribution panel. This portable distribution panel, which I have described in my U.S. patent application Ser. No. 633,062, filed April 24, 1967, titled Portable Distribution Panel, of which the present invention is a continuation-in-part, eliminates the need to set up and disassemble a stationary substitute panel at the site of the building distribution panel for maintenance as described above, thereby saving substantial sums not only in labor cost, but also in the cost of electrical switch-gear involved in setting up the stationary panel equipment.

The present invention has for one of its objects the use of such a portable distribution panel in association with a new and improved system for electrical transfer at a main distribution panel to permit the shut-down for maintenance, repair or replacement of the main distribution panel without the necessity of electrical cable cutting or splicing, while at the same time maintaining continuous electrical service.

It is a more particular object of this invention to provide an auxiliary electrical distribution panel for use in association with a main panel and including flexible cable plug-in patch assemblies for connecting the auxiliary panel to a portable distribution panel wheeled into close proximity with the auxiliary panel, and further including transfer switches operative to switch sub-feeders or utilization circuits of the main panel to the auxiliary panel for placing the main panel either partially or fully out of service, as may be required.

Another object of the invention is to provide novel and improved cooperative plug and receptacle type electrical connectors in association with the ends of heavy flexible electrical cables adapted for use as patch cable assemblies capable of carrying up to 2000 amperes, depending upon their size, for transferring electrical energy from a main source of supply to a portable distribution panel of the character above described, thereby to temporarily transfer the power distribution from the main panel to the auxiliary panel.

It is another object of the invention to provide, particularly for new construction installation, a combined main power distribution panel and auxiliary power distribution panel so arranged and interconnected in an electrical system as will minimize the possibility of damage to the auxiliary panel and its associated distributive wiring upon breakdown due to fire, explosion or the like at the main panel, and at the same time permitting easy and rapid transfer to an associated portable distribution panel as hereinabove described for restoring electrical service under such emergency conditions, and alternatively, for routine maintenance and repair of the main panel.

Still another object is to provide mechanism facilitating the "plugging in" of flexible patch cable assemblies as described above, particularly patch conductors of high current carrying capacity such as will be used in the interconnection of the main feeder circuit to the input bus bars of a portable distribution panel.

Other objects, features and advantages of the invention will be apparent from the following description when read with reference to the accompanying drawings. In the drawings, wherein like reference numerals denote corresponding parts throughout the several views.

Figure 1:
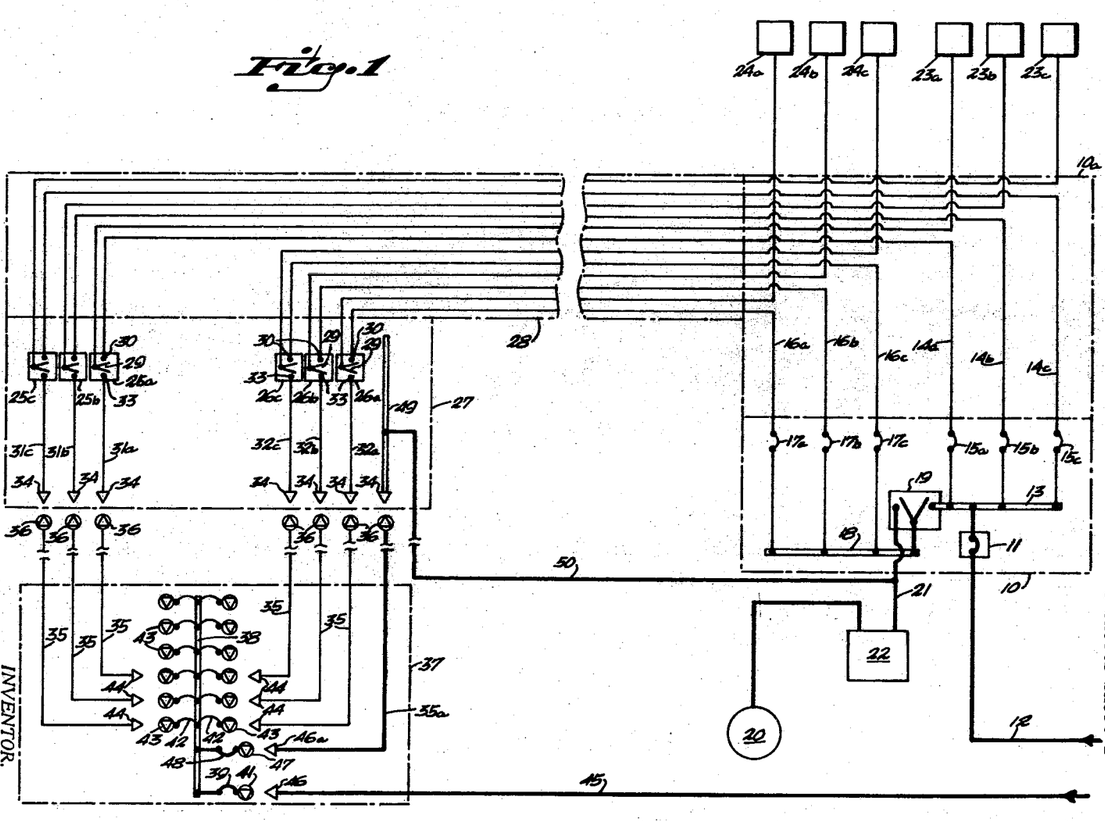
FIG. 1 is an electrical schematic diagram of a simplified auxiliary panel embodying the invention shown interconnected as an addition to a previously installed main panel, and further showing, schematically, the use therewith of a portable distribution panel to by-pass the main panel under emergency conditions or during routine maintenance thereof without interruption of electrical service in the buildings.

Referring now in detail to the drawings and considering first the embodiment of the invention illustrated schematically in FIG. 1, 10 designates the main electrical distribution panel in an existing building and having, by way of example, a main overcurrent protection device and switching means, indicated at 11, fed from a power company feeder 12 and leading a bus-bar conductor system, indicated at 13, to a plurality of distribution or utilization circuits 14a, 14b and 14c (only three shown by way of example), individually fused as indicated at 15a, 15b and 15c, respectively. It will be understood that the power circuits 12, 13 and 14, although illustrated by single lines for simplification, in practice would each be multiple conductors, for example three or four conductors in the usual case of a three-phase distribution system for heavy industrial, commercial or military usage. The existing main power distribution panel 10 may also contain a plurality of distribution circuits 16a, 16b and 16c, fed through respective individual fuses 17a, 17b and 17c from a second bus-bar conductor system 18 connectable, selectively, through a transfer switch 19, either to the main bus-bar conductor system 13 or to an auxiliary power system provided by a local alternator set 20 in the building through a feeder circuit 21 leading to a control panel 22 associated with said alternator set. It will be understood that the alternator set 20 is provided for at least partially restoring electrical service to preferred electrical distribution circuits (those indicated as 16a, 16b and 16c in FIG. 1), in the event of utility company power failure, or in the event of a partial breakdown in the main distribution panel 10 affecting operation of the main bus-bar conductor system 13. In such instances, and assuming that the remainder of the bus-bar circuitry feeding the distribution circuits 16a, 16b and 16c to be intact and operable, the alternator set 20 can be put into operation and the transfer switch 19 thrown to the left to disconnect from the main bus-bar conductor system 13 and supply power to said distribution circuits from said alternator.

In accordance with my invention, the distribution circuits 14a, 14b, 14c, 16a, 16b and 16c, which, in electrical distribution systems as heretofore known, have lead directly to utilization devices such as lighting circuits, motors etc., or to sub-panels feeding such utilization devices, either of which are indicated at 23a, 23b, 23c, 24a, 24b and 24c, respectively, are opened at a location in the wireway portion 10a at the upper end of the main panel 10, and connected in series with individual double-throw transfer switches 25a, 25b, 25c, 26a, 26b and 26c, respectively, in an auxiliary panel 27 through a metal raceway 28. The auxiliary panel 27, in a metal housing secured to the other end of the raceway 28, is preferably located at about twenty feet to one side of the main panel 10.

As illustrated in FIG. 1, the individual distribution circuits 14a, 14b etc. are connected in series with the movable contact arms, indicated at 29, and one of the contact terminals sets, indicated at 30, of the double-throw transfer switches 26a, 26b, etc., the circuit portions leading to their associated utilization devices 23a, 23b, etc. being connected to said movable contact arms to effect transfer of connection of the utilization circuits to respective circuits 31a, 31b, 31c, 32a, 32b, 32c, respectfully, of the auxiliary panel 27 upon switch-over of said transfer switches to connection with the other of their respective fixed contact terminal sets, indicated at 33. The panel contact terminal sets 33 lead to plug connectors, schematically indicated at 34, fixed in the face of the auxiliary panel 27 and adapted to be connected by separate flexible patch cable assemblies 35 fitted at one end with receptacle connector members 36 adapted to be plugged into said connectors.

Figures 4, 5, 6:
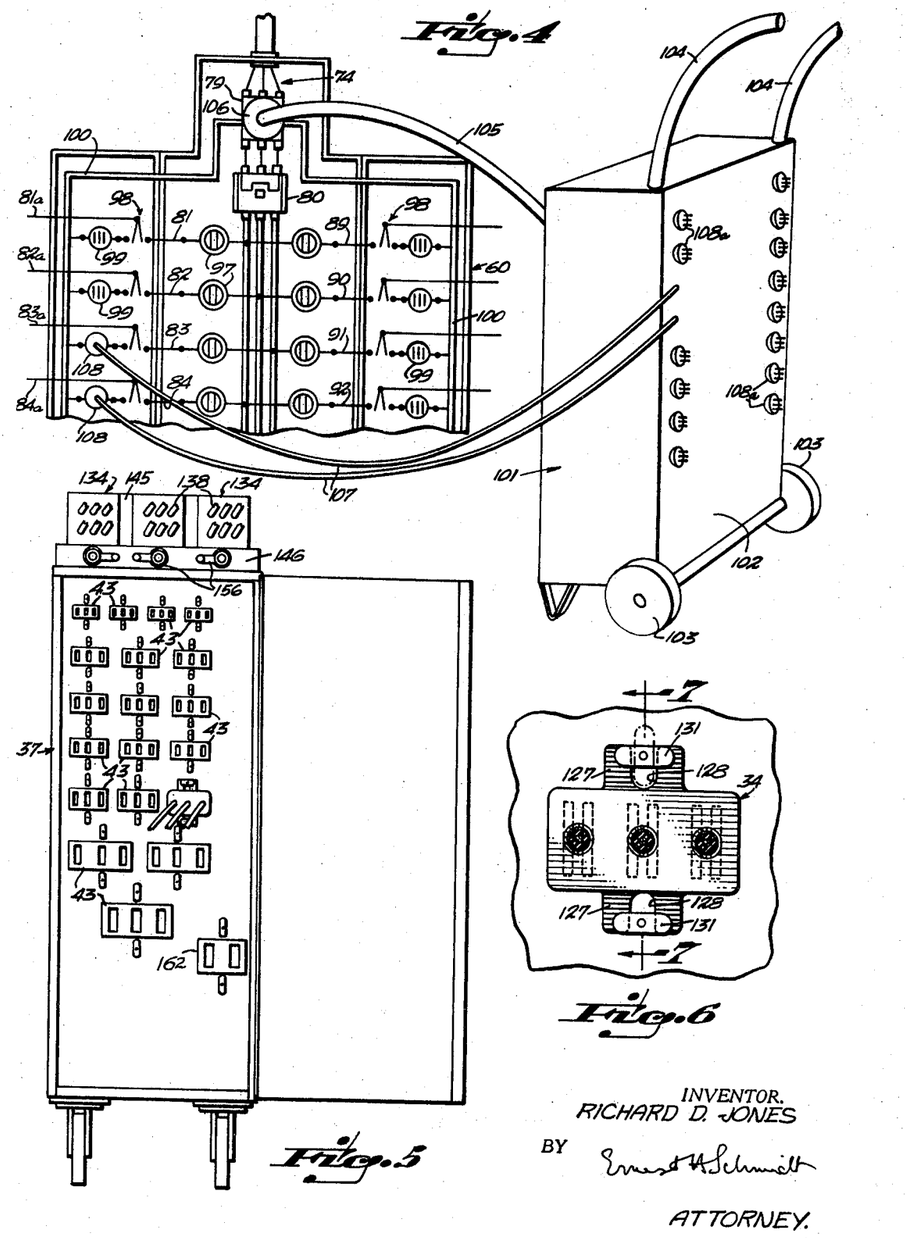
FIG. 4 illustrates a portion of the sub-panel of FIG. 3 shown in use with a portable sub-panel for by-passing fused feed circuits in the sub-panel to permit repair or maintenance thereof without the interruption of service.
FIG. 5 is a receptacle end view of a portable power distribution panel embodying the invention illustrating constructional details thereof and showing how the physical size of the receptacle connectors increase with increase in their electrical current capacity.
FIG. 6 is a enlarged, fragmentary view, illustrating in front elevation, one of the patch conductor plugs in place in one of the portable power distribution panel receptacles, as seen in FIG. 5.
Figure 12:
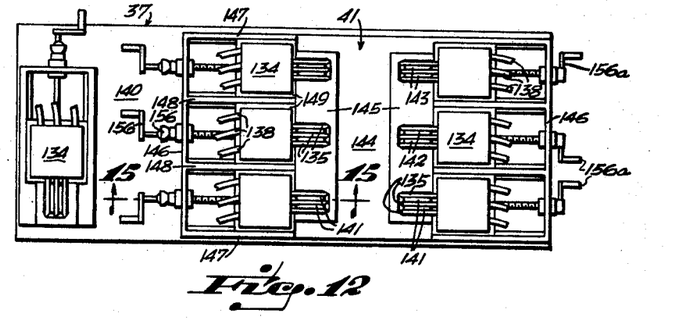
FIG. 12 is a top view of the portable power distribution panel shown in FIG. 5, illustrating details of the manually-operated mechanism for plugging in high amperage patch cable assemblies feeding to or from the portable panel.

Numeral 37 in FIG. 1 designates, schematically, a portable power distribution panel used in association with the above-described auxiliary panel 27, as hereinbelow more particularly described. Such a portable distribution panel is disclosed for the most part in my above-mentioned co-pending U.S. patent application Ser. No. 633,062 filed April 24, 1967 and titled Portable Distribution Panel. The differences between the portable distribution panel therein disclosed and the portable distribution panel of the present invention are set fotrh in detail hereinbelow with reference, in addition to FIG. 1, to FIGS. 5 through 16 of the drawings. In brief, as illustrated in FIG. 1, the portable distribution panel 37 embodying the present invention, which is on wheels and of such size as permits it to be transported close to the auxiliary distribution panel 27, comprises an internal bus-bar conductor system, indicated at 38, energized through a main switch 39 connecting with a feeder input receptacle connector 41 which, as shown in FIG. 12, is located at the top of the housing structure for manually operated plug-in connection as hereinbelow more particularly described. The bus-bar conductor system 38 is connected through a plurality of fuse or circuit-breaker devices 42 to respective connector receptacles 43, which are of different sizes to accommodate different current load capacities such, for example, as load capacities varying from 30 amperes to 600 amperes. As illustrated in FIG. 5, wherein there is shown the receptacle connector end of a portable distribution panel comprising the present invention, it will be seen that the individual connector receptacles 43, although identical in structure, are graduated in size in accordance with their amperage or power distribution capacity.

In using the portable distribution panel 37, under routine or emergency conditions rendering the main panel 10 out of service, it is only necessary to supply feeder current by plug-in connection to the main feeder input receptacle connector 41, after which patch cable assemblies 35 of appropriate amperage and therefore of matching size can be plugged between receptacle connectors 43 in the portable panel and plug connector members 34 in the auxiliary panel. Thereafter, main switch 39 can be closed and transfer switches 25a, 25b, 25c, 26a, 26b and 26c can be switched over to energize the utilization devices or remote sub-panels 23a, 23b, 23c, 24a, 24b and 24c through the portable distribution panel 37.

Under such operation, it will be evident that the main panel will be rendered "cold," upon disconnect of the main feeder 12, if energized, to permit repair, routine maintenance, replacement of parts and the like to proceed safely and in a workmenlike manner.

It will be noted that the flexible patch cable assemblies 35 are equipped, at the end opposite their receptacle connector members 36, as described above, with plug connector members 44 adapted to fit into pertaining ones of the portable distribution panel connector receptacles 43, and that these connectors, the mechanical details of which are hereinafter described in detail, are arranged so that the patch conductor assemblies 35 cannot be energized from the receptacle end to accidently permit energization of its plug connector end with the attendant hazard of short circuiting and electrical shock through mishandling.

The portable distribution panel 37 can be energized directly from an alternative utility line drop or feeder 45 connected through a feeder input plug connector 46 to the main feeder input receptacle connector 41 hereinafter more particularly described, or, in the event that the only power available is from the alternator set 20, through an auxiliary feeder input receptacle connector 47 in the portable distribution panel 37 connected to the internal bus-bar conductor system 38 through an auxiliary main switch 48. To this end, the auxiliary panel 27 is equipped with a bus conductor 49 terminating in a plug connector 34 and connected through conductor circuit 50, to the alternator feeder circuit 21. By utilization of a patch cable assembly 35a having a plug connector member 46a adapted to be plugged into the auxiliary feeder input receptacle connector 47, it is possible to energize the portable distribution panel 37 by use of the alternator set 20. It is to be understood that, in accordance with standard safety practice, the main and auxiliary main switches 39 and 48, respectively, will be protected against simultaneous use by means of a Kirk-key interlock system.

Figure 2:
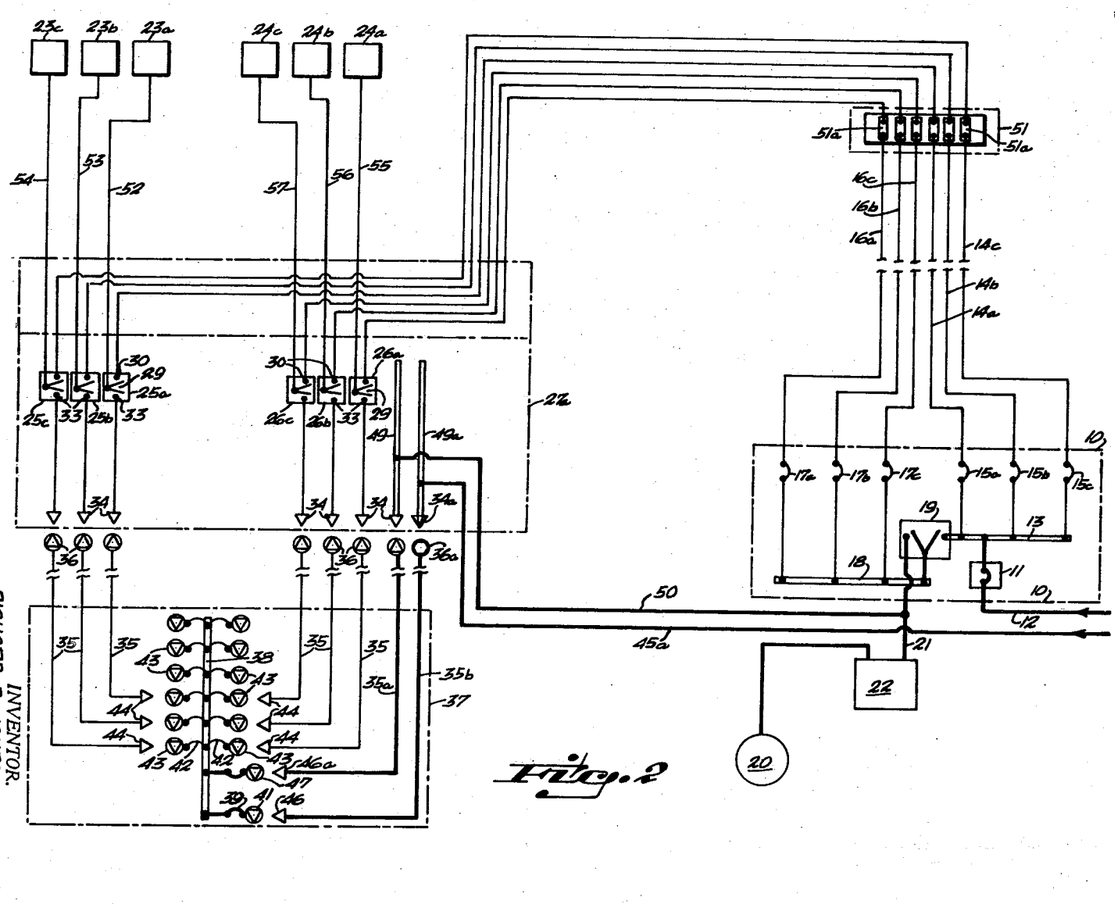
FIG. 2 is an electrical schematic diagram of an electrical power distribution system embodying the invention, similar to FIG. 1 but with modifications illustrating preferred wiring in new construction installation.

Referring now in detail to FIG. 2 of the drawings, wherein an electrical power distribution system is shown which is particularly well suited to new construction installation, the same differs from the additive system illustrated in FIG. 1 and described in detail above principally in that the distribution or utilization circuits 14a, 14b, 14c, 16a, 16b and 16c are carried from the main electrical panel 10, through appropriate conduits, into a connector box or panel 51, wherein they cross-connect through a like plurality of terminal connectors 51a before extending, also through appropriate conduits, to the contact terminal sets 30 of their respective transfer switches 25a, 25b, 25c, 26a, 26b and 26c in the auxiliary panel 27a. As in the embodiment of the invention illustrated in FIG. 1, the utilization devices or sub-panels feeding such utilization devices 23a, 23b, 23c, 24a, 24b and 24c connect directly, through circuits indicated at 52 through 57, respectively, in FIG. 2, to the movable contact arms 29 of transfer switches 25a, 25b etc. The remainder of the circuitry comprising the power distribution system illustrated in FIG. 2 is the same as that illustrated in FIG. 1 as described above, with the exception that a second or alternative power company line drop 45a can, in the installation of the equipment, be carried directly to a second bus conductor 49a provided in the auxiliary panel 27a and terminating in a plug connector 34a for cooperative plug-in interconnection with a receptacle connector member 36a at one end of a patch cable assembly 35b for alternative interconnection with the auxiliary feeder input receptacle connector 41 of the portable distribution panel 37. Preferably, the plug connector 34a and the receptacle member 36a are of such design, as distinguished from the plug connector and receptacle members 34 and 36, as will not permit mixing interconnection thereof.

Operation of the distribution system illustrated in FIG. 2 and use of the associated portable distribution panel 37 will otherwise be identical with that illustrated and described above in connection with the additive system of FIG. 1. It is to be noted that in the installation of the distribution system of FIG. 2, the connector box 51 and associated terminal connectors 51a serve as a safety device in case of fire or explosion damage to the main distribution panel 10, and as a means for facilitating the rewiring, if such becomes necessary, of said main panel.

It is further to be noted that since the wiring from the utilization devices or sub-panels feeding such devices 23a, 23b, 23c, 24a, 24b and 24c, is direct to the auxiliary panel 27a, and that since said auxiliary panel will be located at least twenty feet removed from its associated main panel, there is little likelihood that extensive damage caused by fire or explosion in the main panel could affect operation of the auxiliary panel and its associated distribution wiring.

Figure 3:
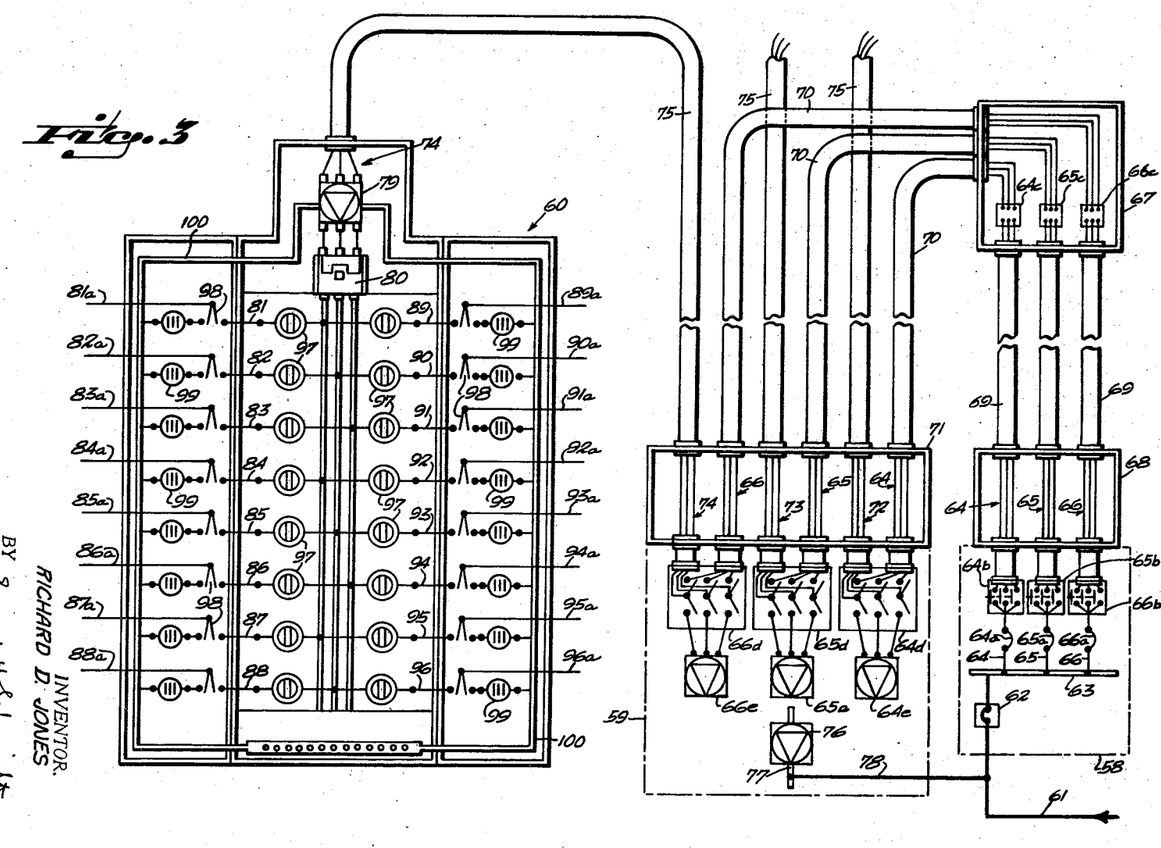
FIG. 3 is a mixed schematic and mechanical diagram of an electrical distribution system of the type illustrated schematically in FIG. 2 and further illustrating details of one of the sub-panels equipped with power transfer and auxiliary plug-in mechanism embodying the invention for sub-panel circuit by-pass at branch locations of the electrical system by use of a portable sub-panel and patch cords embodying the invention.

Referring now to FIG. 3 of the drawings, there is illustrated therein a mixed mechanical and schematic drawing of a new construction electrical power distribution system similar to that of FIG. 2 described above but with a reduced number of circuits for simplicity. FIG. 3 further illustrates, in association with the power distribution system, a sub-panel with power transfer and auxiliary plug-in mechanism embodying the invention for sub-panel circuit by-pass at branch locations of the electrical system by use of a portable sub-panel and patch cords. Numerals 58 and 59 in FIG. 3 designate the main panel and an auxiliary panel, respectively, in a new construction of an electrical distributing system embodying the invention, and 60 designates, on a comparatively enlarged scale, a remote sub-panel further embodying the invention as described above. The main panel 58 is fed from a power company feeder drop line 61 through a main protective device 62 to a bust conductor system indicated at 63. The bus conductor system 63 feeds individual circuits 64, 65 and 66 through fuses 64a, 65a, 66a and protective switches 64b, 65b and 66b to feed-through connector strips 64c, 65c and 66c in a terminal box 67. It will be noted that the wiring associated with the main panel 58 is protected in a wireway 68 at the top of the panel box, and conduits 69 leading between said wireway and the terminal box 67. The individual circuits 64, 65 and 66 extend from their respective connector strips 64c, 65c and 66c through protective conduits 70 into the wireway 71 at the top of the auxiliary panel 59, where they pass for connection to corresponding fixed contact terminal sets of individual transfer switches 64d, 65d and 66d. The other sets of fixed contact terminals of the transfer switches connect to respective plug connectors 64e, 65e and 66e, corresponding to plug connectors 34 in the systems illustrated in FIGS. 1 and 2, for selective interconnection with the portable distribution panel 37 (not illustrated in FIG. 3), for the use and purposes hereinabove described.

The movable contact arm sets of the transfer switches 64d, 65d and 66d connect by means of wiring indicated at 72, 73 and 74, respectively, extending through conduits 75, to the remote utilization devices or sub-panels feeding such utilization devices, such as the remote panel 60 (only one illustrated) in FIGS. 3 and 4. The auxiliary panel 59 is also equipped with a plug connector 76 connected through a bus conductor system, indicated at 77, and conductor 78, to the main power company feeder drop 61 for energizing a portable distribution panel 17 through an appropriately-sized patch cable assembly, as described above in connection with the operation of the portable distribution panel 37 in association with the system illustrated in FIG. 1.

The remote sub-panel 60 (FIGS. 3 and 4) differs from ordinary power distribution panels only in that a receptacle connector member 79 is provided in connection with the input circuit (Distribution circuit 74) leading to the usual circuit-breaker or other protective device 80 feeding to individual sub-distribution circuits 81 through 96 through individual fuses 97; and in that instead of the sub-distribution circuits 81 through 96 thence leading directly to their utilization devices, they connect with one fixed terminal each of individual transfer switches 98, removable switch arms of which connect with the individual single phase circuits, indicated at 81 through 96a to the utilization devices, which may be small motors, lighting circuits and the like. The other fixed terminals of the transfer switches 98 connect to one terminal each of respective plug-in receptacle members 99 located in the front of the auxiliary sub-panel 60, the other terminals of said plug-in recepticle members being connected with a common ground bus bar 100.

As illustrated in FIG. 4, a portable sub-panel unit 101 is provided for by-passing the main protective device 80 and circuit fuses 97 and associated bus bar conductor system in the sub-panel 60 when required for its emergency repair or routine maintenance, said portable sub-panel embodying an ordinary distributor panel with main circuit-breaker and distribution circuit fuses (not illustrated) contained in a rectangular, box-like housing 102 on wheels 103 and having upper end handles 104 for ready wheeling from place to place as one would add hand-cart. The input or feeder circuit of the portable sub-panel 101 extends through a flexible cable 105 to terminate in a plug connector member 106 adapted to plug into the receptacle connector member 79 of the sub-panel 60. The individual distributor circuits of the sub-panel 101 extends through flexible cables 107 to terminate in connector plugs 108 adapted to plug into the receptacle connector members 99 of the sub-panel. Preferably, the flexible cables 105, 107 are wound on spring-loaded reels within the portable panel housing 102 (not illustrated) serving to keep unused cables withdrawn, as illustrated by the limit positions of the connector plugs 108a associated with the unused cables 107 in FIG. 4.

In use, as illustrated in FIG. 4, the main feed plug connector member 106 will be plugged into the receptable connector member 79, after which connector plugs for individual feeder circuits can be plugged into sub-panel receptacles 99 associated with the sub-panel distributor circuits to be by-passed, and their respective transfer switches 98 thrown for connection of the associated sub-panel distributor circuits with said receptacle connector members. Any one or all of the individual fused distributor circuits of the sub-panel 60 can thus be cut out of the system for repair and maintenance as long as the portable panel 101 is available as a substitute protective panel for maintaining energization of circuits normally fed through the sub-panel 60.

Figures 7, 8, 9, 10, 11, 13, 14:
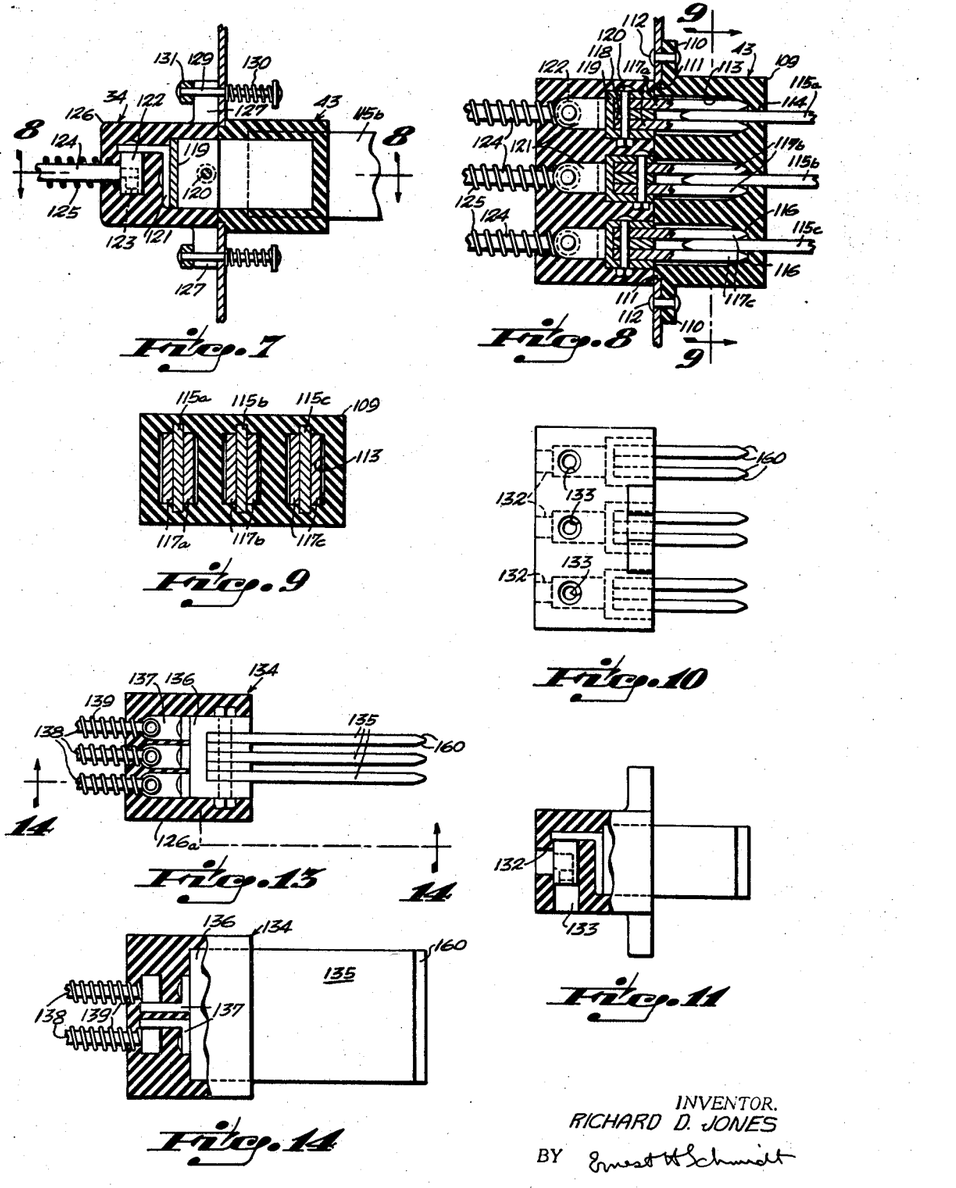
FIG. 7 is a vertical cross-sectional view, taken along the line 7—7 of FIG. 6, illustrating constructional details of the plug and receptacle connector units.
FIG. 8 is a transverse cross-sectional view, taken along the line 8—8 of FIG. 7, further illustrating details of the plug and receptacle connectors.
FIG. 9 is a transverse cross-sectional view, taken along the line 9—9 of FIG. 8 in the direction of the arrows.
FIG. 10 is a plan view of a typical adaptor member for plugging into the portable distribution panel receptacles illustrated in FIG. 5 for converting them to solderless lug connection.
FIG. 11 is a side elevational view thereof, with portions broken away to reveal internal construction.
FIG. 13 is a top view, partly in horizontal cross-section, of a high amperage patch cable feeder plug for cooperative use with the manually-controlled plugging mechanism illustrated in FIGS. 12, 15 and 16.
FIG. 14 is a vertical cross-sectional view thereof, taken along the line 14—14 of FIG. 13 in the direction of the arrows.

FIGS. 6 through 9 illustrate constructional details of preferred forms of connector receptacles 43 and plug connectors 34. The connector receptacles 43 comprise rectangular insulating housing members 109 formed, such as by molding, of a tough, non-conductive synthetic plastic material, provided at the front with opposed, apertured, mounting ears 110 for securing them against the inside of rectangular openings 111 in the receptacle end wall of the portable distribution panel 37, as by rivets 112. As best illustrated in FIGS. 8 and 9, the front of housing member 109 is formed along its length with three (one for each phase conductor of a 3-phase current system), equidistantly-spaced, rectangular blind openings 113 which extend somewhat short of the inner end of said housing member and communicate with central, through openings 114 of about one-third the width of said blind openings and of somewhat greater breadth (see FIG. 9). Fitted within the through openings 114 are respective flat contactor bars 115a, 115b, 115c which extend forwardly somewhat short of the front ends of the housing member 109 and which, at their rearwardly extending ends, are adapted to be clamped or otherwise electrically interconnected with the conductive bus bar system within the interior of the portable distribution panel 37. As illustrated at 116 in FIG. 8 and for the purpose hereinafter described, the longitudinal inner corners of each of the rectangular openings 113 are beveled to gradually converge toward the center.

The plug connectors 34 each comprise three pairs of plug contactor bars or blades 117a, 117a; 117b, 117b and 117c, 117c of such width and thickness as to be received within one receptacle openings 113 in pairs at each side of the receptacle contactor 113 in pairs at each side of the receptacle contactor bars 115a, 115b and 115c, respectively, said plug contactor bar pairs being supported in appropriately spaced relation as by flat metal spacers 118 and U-shaped clamp yokes 119 surrounding the outer ends and secured as by through bolts 120. The outer ends of the clamp yokes 120 have secured thereto, as by riveting, solderless angle members 121 the outwardly-extending arm portions of which are fitted with solderless connector lugs 122 provided with set-screws 123 for securing individual insulated conductors or cables 124. Preferably, to minimize breakage and wear due to bending of the conductors 124 at their plug connector ends, they are sleeved with stiff, helical springs 125 the outer ends of which are preferably molded in place within a molded rectangular insulating housing 126 out of electrical contact with the connector lug structure.

As a means for supporting the plug connectors 34 in place when plugged into their matching receptacles 43 in the portable distribution panel 37, the rectangular insulating housings 126 are integrally formed at the front thereof with opposed, centrally-located rectangular ears 127, 127 having transversely-extending slots 128 (see FIGS. 6 and 7), adapted to receive latch pins 129 extending through openings in the face of said panel, said latch pins being spring-loaded from the rear as by having circumjacently constrained thereon helical springs 130. The outer ends of the latch pins 129 carry crossbars 131 which, as illustrated in FIG. 6, can be turned from the broken line positional representation thereof to the full-line position to resiliently clamp the plug connectors 34 in place.

FIGS. 10 and 11 illustrate a modified form of plug connector which, instead of being fabricated with permanently affixed conductor leads, is provided with cable openings 132 and set-screw openings 133 permitting the assembly of cables thereto in the field. The construction and operation is otherwise the same as that of the plug connector 34, described above.

Numeral 134 in FIGS. 12 through 16 designates a high current (high amperage) connector for the connection of main feeders leading to or from the portable distribution panel 37. The principal difference between the plug connectors 34 and 134 is that the latter are designed to carry only one phase connection, and that they are used in groups of three for connection of the individual circuit current phases of a 3-phase system. As illustrated in FIGS. 13 and 14, each plug connector 134 comprises three spaced plug contactor bars or blades 135 secured to spaced relation by a U-shaped yoke member 136 secured against the back of which, as by riveting, are a plurality, six in the embodiment illustrated, of angle members 137 equipped with solderless connector lugs connecting flexible insulated cables 138 sleeved with helical springs 139. A rectangular housing 126a of an insulating synthetic plastic material is molded in enclosing relation about the inner ends of the contactor bars or blades 135 and the connected ends of the flexible insulated cables 138.

Figure 15:
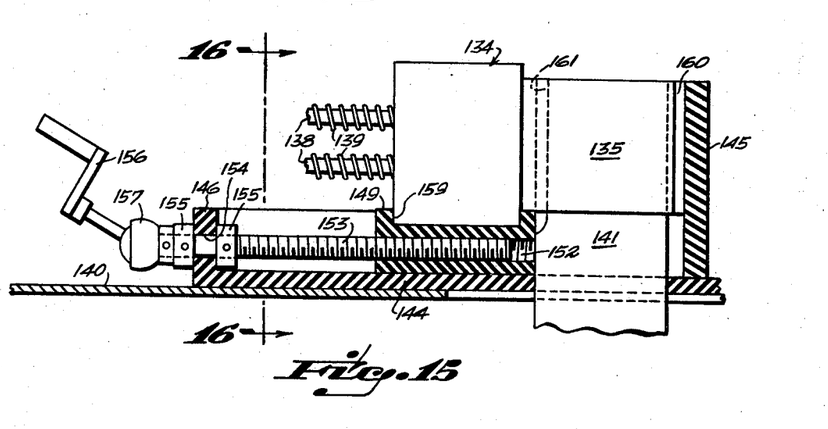
FIG. 15 is a vertical cross-sectional view taken along the line 15—15 of FIG. 12 in the direction of the arrows and illustrating, on an enlarged scale, mechanical details of the manually-operated mechanism for plug-in connection of main feeder patch conductor plugs.

As illustrated in FIGS. 12 and 15, the top wall 140 of the portable distribution panel 37 has openings through which pass upper end connector portions of two groups of three pairs each of bus-bar extension portions or blades 141, 142 and 143, each pair representing a single leg or phase connector of a 3-phase main power feeder supply leading (in one or the other group of three pairs) either to or from the portable distribution panel. Each group of three of the said bus bar extension portions or blades 141, 142, 143 also extends through openings in the bottom wall of an insulating housing 145, open at the top and having a short, upstanding front wall 146 in spaced relation from said blades. The housings 145 each are formed with short, upwardly-extending, opposed outside walls 147, 147 and equidistantly-spaced intermediate walls 148 which, together with said side walls and the front wall 146, define three side-by-side, rectangular recesses in front of the extension blade pairs 141, 142 and 143 adapted to receive, reciprocably fitted therein, rectangular carrier members 149. As a means for constraining the carrier members 149 to reciprocative movement within their respective recesses in the housings 145, said carrier members are formed along their side walls with grooves 151 receiving complemental guide ribs 150 integrally formed in the housing side walls 147 and intermediate walls 148.

As a means for mechanically moving the carrier members 149 back and forth within their respective rectangular housing recesses, said carriers are formed with central, longitudinally-extending, through openings 152 threadingly received within which are screw rods 153 journalled, at their outer ends, in openings 154 in the housing front wall 146 and held in place by collars 155 secured to said rods at each side of said front wall. The outer ends of the screw rods associated with the central housing 145 (see FIG. 12), carry cranks 156 having universal joints 157 to facilitate manual turning thereof for making or breaking connection as hereinbelow described. The cranks 156a associated with the end housing 145, being more easily accessible, are not equipped with universal joints.

Figure 16:
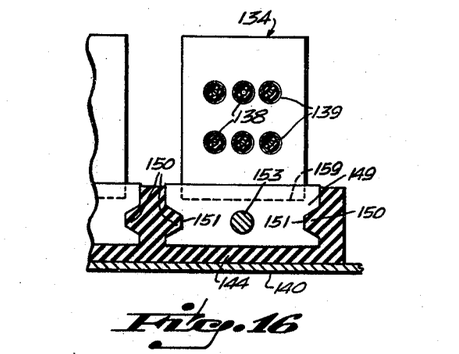
FIG. 16 is a vertical cross-sectional view, taken along the line 16—16 of FIG. 15 in the direction of the arrows and illustrating constructional details of manually-operated main feeder patch plugging mechanism.

As best illustrated in FIGS. 15 and 16, the upper surfaces of the carrier members 149 are formed with rectangular recesses 159 of such size as to seat snugly fitted therein the undersides of individual ones of the housings 126a of the plug connectors 134. In making plug-in connections of a plug connector 134, the carrier members 149 will be withdrawn to the left, (as viewed in FIG. 15), to permit seating therein if said plug connectors as described above, after which the crank handles will be turned to move the plug contactor blades 135 into face-to-face intermeshing engagement with their associated extension blade pairs 141, 142, 143. As illustrated in FIG. 15, to facilitate the intermeshing of the various connector blades comprising the connector members as illustrated in FIGS. 8, 10, 11, 12, 13, 14 and 15, the ends thereof are beveled along each side as indicated at 160. As best illustrated in FIG. 8, the outer beveled faces of the contactor blades slide against the beveled inner corners of the housing recesses 113 when in their fully plugged-in positions to more tightly wedge the interfitting contactor blades together and thereby achieve reliable electrical interconnection. As illustrated in FIG. 15, the front edges of the bus bar extension blades 141, 142, 143 are beveled, as indicated at 161, to facilitate sliding intermeshing with their respective plug contactor blades 135. The housings 145 are similarly molded with corner bevels serving to wedge the contactor blades 135 into intimate contact with their respective pairs of extension blades 141, 142, 143.

As illustrated in FIG. 12, a seventh plug connector 134 is provided along the left side of the top of the portable distribution panel 37 for ground connection. As illustrated in FIG. 5, at least one ground connection receptacle 162 is also provided in the connector wall of the portable distribution panel 37.

An important advantage of the invention resides in the fact that it enables by-passing of high-capacity electrical power distribution panels by means of portable electrical distribution equipment using patch cables with plug-in type electrical circuit connectors, thereby greatly facilitating the provision of temporary or substitute electrical distribution for the repair, maintenance and replacement of main distribution panels with minimum, if any, "down" time and at a fraction of the cost heretofore necessitated by the "splicing in" of stationary temporary replacement switchgear.

Another important advantage of the invention is that it makes economically practicable the routine maintenance of high capacity power distribution panels and associated electrical equipment, such as emergency alternators and the like, at such close intervals as will forestall serious breakdown of equipment, an advantage which is particularly important in installations where electrical service interruption cannot be tolerated, even for short intervals.

While I have illustrated and described herein various forms in which my invention can conveniently be embodied in practice, it is to be understood that these forms are presented by way of example only, and not in a limiting sense. The invention, in brief, comprises all the embodiments and modifications coming within the scope and spirit of the following claims.

What I claim as new and desire to secure by Letters Patent is:

1. Auxiliary distribution by-pass apparatus for use in association with a primary electrical power distribution panel comprsing an auxiliary panel adapted to be located in spaced relation to the primary panel and having a plurality of double-throw transfer switches and a first plurality of multiple-conductor, separable, electrical connectors, one for each of said transfer switches, circuitry interconnecting said primary and said auxiliary panels and including said transfer switches for the switching of individual utilization circuits in an electrical distribution system, selectively, between said primary panel and said electrical connectors, a portable distribution panel having a main power input means and distribution circuits terminating in a second plurality of separable electrical connectors, and multiple conductor patch cables having electrical end connector members operable to interconnect selected ones of said first plurality of separable connectors with selected ones of said second plurality of separable electrical connectors.

2. An auxiliary distribution by-pass apparatus as defined in claim 1 wherein said first and second pluralities of separable electrical connectors are of graduated size in accordance with a range of current-carrying capacities.

3. Auxiliary distribution by-pass apparatus as defined in claim 1 wherein said main power input means comprises a first separable feeder current electrical connector in said auxiliary panel, an electrical feeder circuit connecting with said first feeder current electrical connector, and a flexible patch cable having at one end a second separable feeder current connector receivable for electrical interconnection in said first separable feeder current electrical connectors and having at the other end connector means for making electrical connection with said main power input means.

4. Auxiliary distribution by-pass apparatus as defined in claim 1 including a sub-panel connected at the remote end of at least one of said individual utilization circuits for local sub-distribution thereat, said sub-panel having a second plurality of double-throw transfer switches and a third plurality of multiple-conductor, separable electrical connectors, one for each of said transfer switches, circuitry including said second plurality of transfer switches for the switching of individual sub-utilization circuits in an electrical sub-distribution system, selectively, between said sub-panel and said third plurality of connectors, said sub-panel having a multiple-conductor, separable, input sub-panel connector in parallel with said remote end of said one of said individual utilization circuits, a portable sub-distribution panel having sub-panel power input means and distribution circuits terminating in flexible connector means operable to be connected with selected ones of said third plurality of electrical connectors.

5. An auxiliary distribution by-pass apparatus as defined in claim 4 wherein said flexible connector means comprises multiple-conductor cables extending from said sub-distribution panel and terminating in electrical connector members operable to interconnect with said third plurality of electrical connectors.

6. An auxiliary distribution by-pass apparatus as defined in claim 5 wherein said sub-panel power input means comprises a multiple-conductor cable extending from said sub-distribution panel and terminating in an electrical connector member operable to interconnect with said input sub-panel connector.

7. An auxiliary distribution panel by-pass apparatus as defined in claim 1 wherein said main power input means comprises a first main power, separable electrical connector in said auxiliary panel and circuitry interconnecting said main power connector within an electrical power feeder system, a second main power, separable electrical connector in said portable distribution panel, and multiple conductor patch cable means having electrical connector members operable to interconnect said first main power connector with said second main power connector.

8. An auxiliary distribution panel by-pass apparatus as defined in claim 7 including a local alternator serving as an emergency source of electrical power, a main double-throw transfer switch, said circuitry interconnecting said main power connector including said local alternator and said main power double-throw transfer switch being operable to interconnect said first main power connector either to said electrical power feeder system or said alternator, selectively.

9. An auxiliary distribution panel by-pass apparatus as defined in claim 7, including a local alternator, a third main power, separable electrical connector in said auxiliary panel, circuitry interconnecting said third main power connector with said local alternator, said patch cable means being operable to interconnect, selectively, said third main power connector with said second main power connector.

References Cited
UNITED STATES PATENTS 2,229,729 1/1941 Emde _____________ 307—150
3,132,255 5/1964 Spinelli et al. _______ 307—64

ROBERT K. SCHAEFER, Primary Examiner
T. B. JOIKE, Assistant Examiner

U.S. Cl. X.R.
307—64